United States Patent [19]

Lettington

[11] Patent Number: 4,733,072

[45] Date of Patent: Mar. 22, 1988

[54] RANGEFINDER FOR IMAGING SYSTEM ELIMINATING EFFECT OF ROTOR ROTATION

[75] Inventor: Alan H. Lettington, Worcester, England

[73] Assignee: The Secretary of State for Defence in Her Britannic Majesty's Government of the United Kingdom of Great Britain and Northern Ireland, London, England

[21] Appl. No.: 908,719

[22] Filed: Sep. 18, 1986

[30] Foreign Application Priority Data

Sep. 27, 1985 [GB] United Kingdom ............... 8523849

[51] Int. Cl.⁴ .......................... H01J 3/14; H01J 5/16; H01J 40/14
[52] U.S. Cl. .................................. 250/235; 250/236; 356/5; 350/6.8
[58] Field of Search ............... 356/5, 4, 386; 250/236, 250/235, 234, 203 R, 201; 350/6.8, 6.7, 6.5; 33/284

[56] References Cited

U.S. PATENT DOCUMENTS

| | | | |
|---|---|---|---|
| 3,897,150 | 7/1975 | Bridges et al. | 356/5 |
| 4,084,092 | 4/1978 | Runciman | 350/6.8 |
| 4,457,621 | 7/1984 | Harris et al. | 356/5 |
| 4,458,982 | 7/1984 | Blain et al. | 350/6.7 |
| 4,461,534 | 7/1984 | Runciman | 350/6.7 |
| 4,508,422 | 4/1985 | Karlsson | 350/6.8 |
| 4,537,465 | 8/1985 | Sherman et al. | 350/6.8 |
| 4,542,986 | 9/1985 | Berdanier | 356/5 |
| 4,561,775 | 12/1985 | Patrick et al. | 356/5 |

FOREIGN PATENT DOCUMENTS

| | | |
|---|---|---|
| A3022365 | 5/1981 | Fed. Rep. of Germany . |
| 3211046 | 10/1982 | Fed. Rep. of Germany . |
| 1259148 | 1/1972 | United Kingdom . |
| 2110897 | 6/1983 | United Kingdom . |

Primary Examiner—David C. Nelms
Assistant Examiner—Michael Messinger
Attorney, Agent, or Firm—William R. Hinds

[57] ABSTRACT

An optical imaging system is provided with a pulsed laser rangefinder comprising a transmitter 10 aligned with the boresight of the imaging system, the return pulse being focussed by the telescope 6 of the imaging system upon its multi-mirror, two-rotor arrangement 2, 3 and reflected then to a detector 12 and display 13. To eliminate the effect of rotor rotation during the time-of-travel of the pulse, the latter is first reflected from the rotors to a beam reverser 14 including a 90 degree roof-reflector 18 (FIG. 2), which reflects the pulse back to the rotor mirrors in the same vertical plane and then to detector 12 along a path having a fixed spatial relationship to the path to the imaging-system detector 8.

9 Claims, 2 Drawing Figures

RANGEFINDER FOR IMAGING SYSTEM ELIMINATING EFFECT OF ROTOR ROTATION

The present invention relates to rangefinders for imaging systems and has one application in optical imaging systems which collect infra-red radiation from a scene and produce an image of the scene by means of a rotating scanner.

In our UK Patent application No. 7835096, published as No. GB 2,110,897A, there is described such a rotating scanner comprising two coaxial rotors driven at different speeds, the rotors having sets of correspondingly different numbers of plane mirrors extending round the rotor axes with adjacent mirrors in each set inclined at different angles to the common axis. The rotors are arranged so that radiation, eg infra-red, from a scene is reflected from one set to the other and thence to a detector. This form of scanner avoids the need for a flapping mirror as used in conjunction with earlier forms using a single multi-faceted rotating polygon, to provide frame scan.

In some applications of such rotating scanners, of either of the above kinds, it is desired not only to view the scene but to measure the range of objects in the scene, e.g. in military applications the range to an enemy tank. Laser rangefinders can be used for this purpose, one kind of which transmits short light-pulses which are reflected back from the object and whose time of travel to and from the object is measured as proportional to the range. In particular it is possible to combine such a rangefinder with such rotating scanners, the boresight of the laser transmitter being aligned parallel to the axis of the telescope which images the scene on the scanner and the laser return-pulse being received by that telescope and thereafter imaged on to a detector aligned with the image detector. However, the range is variable and, owing to the high rotational speed of the mirrors, their angle relative to the telescope boresight at the instant of arrival of the return-pulse is also variable. Hence, this return-pulse cannot be brought to a unique range-independent focus-position at a dectector. For this reason it is necessary to remove the effect of rotation on the path of the return-pulse after leaving the scanner, and it is an object of the present invention to provide means for this purpose. This requirement also applies to other kinds of laser rangefinders, eg those using the Doppler effect.

According to the present invention, in an optical imaging system comprising a rotatable scanner, said scanner comprising a plurality of mirrors extending round a rotor, an optial system for directing light-radiation from a scene being scanned on to said rotor mirrors and thence to a detecting means, there is further provided rangefinder means including;

a light transmitter having its boresight aligned with that of said optical directing system whereby the transmitted light returned from the scene by reflection thereat is received by said optical directing system and likewise directed on to said rotor mirrors and light-beam reversing means arranged to receive said returned light after reflection from said rotor mirrors and to reflect said returned light back to said rotor mirrors along a path having a fixed angular relationship, in a plane parallel to the axis of rotation of the scanner, to its path on initially leaving said rotor mirrors whereby said returned light is then reflected from said rotor mirrors to a detecting means along a path having a fixed angular relationship, in a plane parallel to the axis of rotation of the scanner, to that of the light-radiation from the scene to the first-mentioned detecting means (Said fixed angular relationships include zero, but are preferably made sufficient to facilitate location of separate detecting means for the scanning and rangefinding functions.)

Said light-beam reversing means may comprise:

first and second focussing means having their respective optical axes parallel to one another, said focussing means having their respective foci on their one side located in a plane parallel to the axis of rotation of the scanner and containing the entrance pupil of said scanner;

and a reflector means whereof a plane perpendicular to said optical axes of said first and second focussing means includes their respective foci on the other side of said focussing means, said reflector plane being such that the reflector means reflects an image formed at said reflector means by said first focussing means back along a parallel path to said second focussing means and thence to said rotor mirrors.

Said reflector means may be a 90° roof reflector and said plane thereof a plane passing through the line of intersection of its two reflecting surfaces.

Said scanner may be of the kind described in our aforesaid UK Patent Application, the entrance pupil plane thereof being the plane of intersection of each mirror of one set with a mirror of the second set.

The rangefinder may be of the kind which transmits light-pulses whose time-of-travel to and from an object in the scene is measured to obtain the range.

To enable the nature of the invention to be more readily understood, attention is directed, by way of example, to the accompanying drawings wherein.

Figure 1:
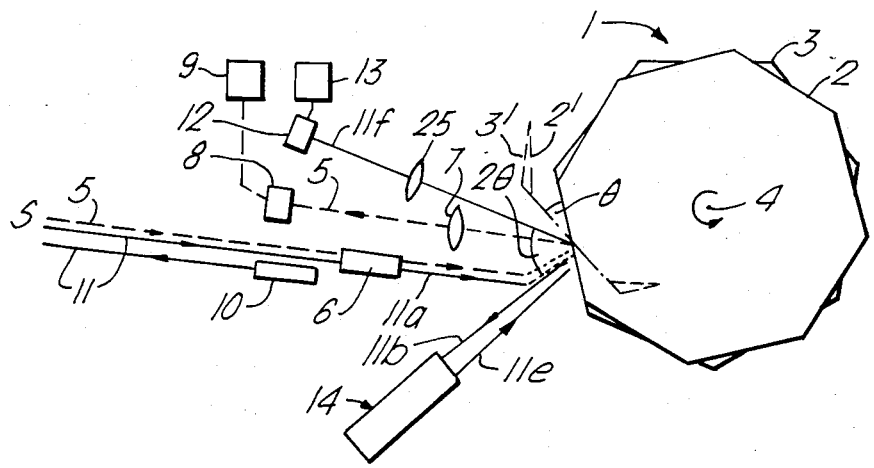
FIG. 1 is a simplified optical diagram of an embodiment of the invention, shown in plan.

In FIG. 1 an imaging system comprises a scanner 1 of the kind described in the aforesaid UK Patent application No. 7835096 including an upper rotor 2 having a set of eight plane mirrors and a lower rotor 3 having a set of seven plane mirrors. The rotors are rotated about a vertical axis 4 at different high speeds and adjacent mirrors of each set are inclined at different angles to the axis 4.

Radiation, e.g. infra red radiation, from a scene S being scanned, shown as the interrupted line 5, is focussed by an afocal telescope 6 on to the lower rotor 3, and thence reflected successively from each of its mirrors to a corresponding mirror of the upper rotor 2 as pairs of upper and lower mirrors come into alignment. From the upper rotor 2 the radiation passes through a focussing system 7 to a detector 8 connected to a display 9. (The interrupted lines 5 to and from the scanner 1 are shown side-by-side in the plane of the paper for clarity, but are actually in the same vertical plane). This arrangement enables both the line and frame scans to be effected by the rotors without need for a flapping mirror to effect the frame scan, and is more fully described in the aforesaid Application. (The latter shows an upper rotor having six mirrors and a lower having five mirrors with the radiation being initially focussed on to the upper, six-mirror, rotor, i.e. on the rotor with the larger number of mirrors. In the present embodiment the radiation is initially focussed on the rotor with the smaller number of mirrors, ie the lower rotor, because this is found to give less distortion, but the principle of operation remains the same).

In accordance with the present invention there is also shown in FIG. 1 the transmitter 10 of a laser rangefinder located to direct a pulsed beam, shown as the continuous line 11, towards the scene, aligned parallel and close to the boresight of the above-described imaging system, i.e. to the axis of telescope 6. Suitably transmitter 10 comprises a $CO_2$ laser producing pulses of infra-red radiation. The pulse reflected back from a selected object in the scene is thus focussed by the telescope 6 on to the lower rotor 3, and then reflected to and from the upper rotor, as with the existing radiation from the scene.

If the rotor mirrors were stationary the pulse could then pass direct via a focussing system 25 to a detector 12 arranged to detect the laser pulse and to display at 13 the range to the object as measured by the time elapsing between the transmission and return of the pulse. However, because the rotors are rotating rapidly, their positions will have advanced during the travel-time of the pulse to and from the object by an amount depending on the range. In an extreme case the pair of mirrors may have rotated beyond their active positions, ie beyond the field of view of the focussing system, and in any case their angle relative to the axis of telescope 6 will have changed. For this reason it is necessary to remove the effect of the scanner rotation on the path 11a of the laser return pulse, after it leaves the scanner.

Figure 2:
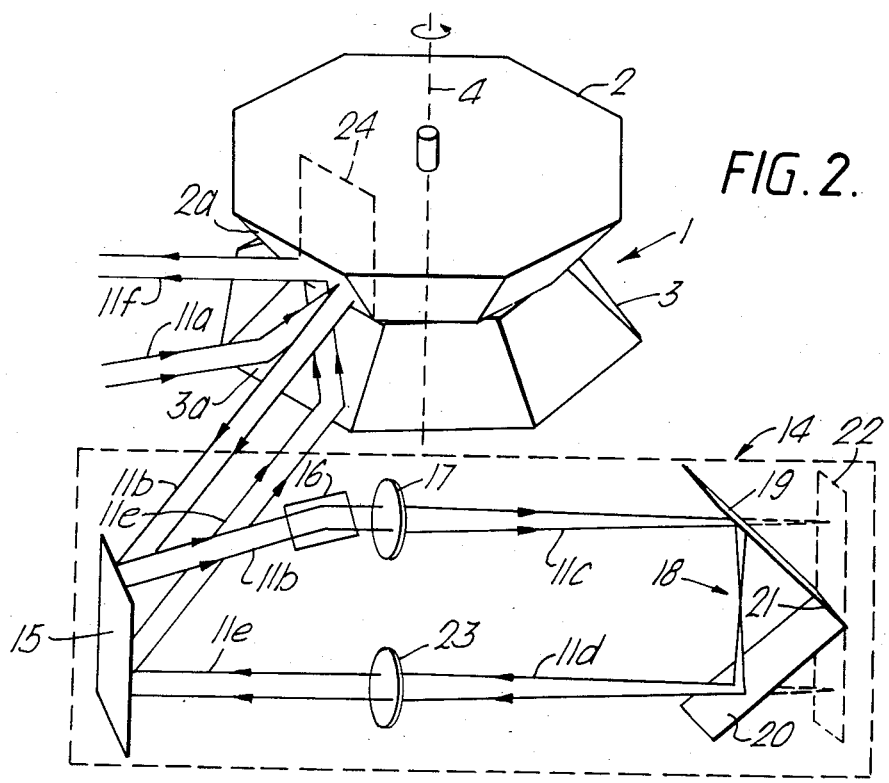
FIG. 2 is a more detailed perspective view of part of the embodiment of FIG. 1.

This removal is achieved by means of a light-beam reverser 14, whose construction is shown in more detail in FIG. 2. In this embodiment the reverser 14 is located at a position displayed by an angle $2\theta$ (FIG. 1) of 60 degrees from the direction to telescope 6 and detector 8, to receive beam 11a as parallel-sided beam 11b when the rotors have moved through angle $\theta$ to position $2^1$, $3^1$, via successive reflectors from mirrors 3a and mirror 2a of the lower and upper mirrors respectively. The precise angular displacement between beams 11a and 11b will, however, vary slightly with the range of the object as explained above, so that $2\theta$ is effectively increased by a variable amount $\Delta 2\theta$ depending on the range.

In reverser 14, beam 11b is reflected from a plain mirror 15, via plain mirror 16, to a focussing lens 17. Beyond lens 17 is a 90° roof-reflector 18 comprising a plain upper mirror 19 and a plain lower mirror 20, the planes of whose surfaces intersect in a horizontal line 21. Lens 17 converts the parallel-sided beam 11b to a focussed beam 11c which is reflected back by reflector 18 as beam 11d to a similar lens 23 and thence as beam 11e to mirror 15. The axes of beams 11c and 11d are parallel to one another in the same vertical plane, although their common horizontal displacement will depend on the value of $\Delta 2\theta$, i.e. on the range. Beam 11e, now parallel, sided, is reflected from mirror 15 to mirror 3a of the lower rotor in the same vertical plane as beam 11b. (In FIG. 1 beams 11b and 11e are shown side-by-side for clarity). Beam 11e is then reflected from mirror 2a as de-rotated, parallel-sided, beam 11f and thence via focussing system 25 to detector 12.

Although beams 11b and 11e between mirror 15 and the rotors are shown parallel in FIG. 2, there is actually an angle of 20 degrees between them in the vertical plane, and hence between beams 5 and 11f to the respective detectors. This divergence of of the beams is not optically essential, but facilitates the location of the respective detectors. Mirror 16 removes this 20 degree divergence as regards beams 11c and 11d.

The de-rotation effect is obtained because the travel-time of the light-pulse through reverser 14 and back to the rotor mirrors is very short and the angular movement of the rotors during this time is sensibly zero. Hence, because beams 11b and 11e are in the same vertical plane, ie make the same displacement angle in the horizontal plane with the rotor mirrors, and have a fixed vertical angle (the aforesaid 20 degrees) between them, the beam 11f to detector 12 bears a fixed spatial relationship to beam 5. This requires (a) that the vertical plane 24 of the entrance pupil, i.e. the vertical plane containing the horizontal line of intersection of mirrors 2a and 3a, should contain the foci (not shown) of lenses 17 and 23 on their left-hand sides in FIG. 2, and (b) that an image of the radiation from the scene is formed at the plane 22 of intersection of the mirrors 19 and 20 of reflector 18; with parallel-sided beams incident at scanner 1, plane 22 also contains the foci of lenses 17 and 23 on their right-hand sides. The acceptance angle of reverser 14 must be sufficiently wise to accommodate the variation in the horizontal angular displacement of beams 11b and 11e at the value of $\Delta 2\theta$ varies with range.

In FIG. 2 only two "fold" mirrors 15 and 16 are shown for folding the optical paths into a confined space. In practice one or more additional plan fold mirrors may be included to produce such confinement, but it is difficult to show these without confusion in a two-dimensional drawing. Their possible positions will be readily apparent to those skilled in optics. The inclusion of such additional mirrors has no effect on the operation of the arrangement provided the requirements specified in the immediately proceding paragraph are still met. The alignment of the rangefinder on to a particular object in the scene whose range is required is effected by physically moving the complete scanner/telescope/beam-reverser assembly until the boresight, ie the axis of telescope 6, is aligned on the object. This can be done in a known matter, e.g. by aligning the object on cross-wires in display 9.

In the described embodiments, separate detectors 8 and 12 are used for the scanning and rangefinding functions respectively. Alternatively, it is possible to use a single detector time-shared between these two functions, but the latter arrangement is not preferred.

Although described in relation to a simple light-pulse rangefinder system, de-rotation of the return beam is also necessary where other laser rangefinder systems, e.g. of the Doppler kind, are used, and the present invention is also applicable where such other systems are combined with a multi-mirror scanner. The invention is also applicable to other forms of multi-mirror scanner than that described, e.g. to those which use a flapping mirror to obtain the frame scan. The invention is also applicable to imaging/rangefinder arrangements which use visible instead of infra-red light.

What is claimed is:

1. An optical imaging system comprising a rotatable scanner, said scanner comprising a plurality of mirrors extending round a rotor, and an optical system for directing light-radiation from a scene being scanned on to said rotor mirrors and thence to a detecting means, wherein there is further provided rangefinder means including:
   a light transmitter having its boresight aligned with that of said optical directing system whereby the transmitted light returned from the scene by reflecting thereat is received by said optical directing system and likewise directed on to said rotor mirrors;

and light-beam reversing means arranged to receive said returned light after reflection from said rotor mirrors and to reflect said returned light back to said rotor mirrors along a path having a fixed angular relationship, in a plane parallel to the axis of rotation of the scanner, to its path on initially leaving said rotor mirrors whereby said returned light is then reflected from said rotor mirrors to a detecting means along a path having a fixed angular relationship, in a plane parallel to the axis of rotation of the scanner, to that of the light-radiation from the scene to the first-mentioned detecting means.

2. A system as claimed in claim 1 wherein said light-beam reversing means comprises:

first and second focussing means having their respective optical axes parallel to one another, said first and second focussing means having their respective foci on their one side located in a plane parallel to the axis of rotation of the scanner and containing the entrance pupil of said scanner;

and a reflector means whereof a plane perpendicular to said optical axes of said first and second focussing means includes their respective foci on the other side of said first and second focussing means, said reflector plane being such that the reflector means reflects an image formed at said reflector means by said first focussing means back along a parallel path to said second focussing means and thence to said rotor mirrors.

3. A system as claimed is in claim 2 wherein said reflector means is a 90° roof reflector and said plane thereof is a plane passing through the line of intersection of its two reflecting surfaces.

4. A system as claimed in claim 3 wherein said first-mentioned detecting means and the detecting means which receives the returned light from the light-beam reversing means are separate detector means.

5. A system as claimed in claim 4 wherein said scanner comprises two coaxial rotors driven at different speeds, the rotors having sets of correspondingly different numbers of plane mirrors extending round the rotor axes with adjacent mirrors in each set inclined at different angles to the common axis, the rotors being arranged so that radiation from a scene is reflected from one set to the other and thence to the detecting means, the entrance pupil plane thereof being the plane of intersection of each mirror of one set with a mirror of the second set.

6. A system as claimed in claim 5 wherein the rangefinder is of the kind which transmits light-pulses whose time-of-travel to and from an object in the scene is measured to obtain the range.

7. A system as claimed in claim 1 wherein said first-mentioned detecting means and the detecting means which receives the returned light from the light-beam reversing means are separate detector means.

8. A system as claimed in claim 1 wherein said scanner comprises two coaxial rotors driven at different speeds, the rotors having sets of correspondingly different numbers of plane mirrors extending round the rotor axes with adjacent mirrors in each set inclined at different angles to the common axis, the rotors being arranged so that radiation from a scene is reflected from one set to the other and thence to the detecting means, the entrance pupil plane thereof being the plane of intersection of each mirror of one set with a mirror of the second set.

9. A system as claimed in claim 1 wherein the rangefinder is of the kind which transmits light-pulses whose time-of-travel to and from an object in the scene is measured to obtain the range.

* * * * *